(12) United States Patent
Wegener et al.

(10) Patent No.: US 12,319,606 B2
(45) Date of Patent: Jun. 3, 2025

(54) DEVICE AND METHOD FOR LENGTH CUTTING IN ULTRATHIN GLASSES

(71) Applicant: SCHOTT AG, Mainz (DE)

(72) Inventors: Holger Wegener, Alfeld (DE); Rainer Schwertfeger, Eschershausen (DE); Michael Maedje, Grünenplan (DE); Christian Diekmann, Grünenplan (DE); Markus Langer, Grünenplan (DE)

(73) Assignee: SCHOTT AG, Mainz (DE)

( * ) Notice: Subject to any disclaimer, the term of this patent is extended or adjusted under 35 U.S.C. 154(b) by 95 days.

(21) Appl. No.: 17/376,076

(22) Filed: Jul. 14, 2021

(65) Prior Publication Data

US 2022/0017401 A1 Jan. 20, 2022

(30) Foreign Application Priority Data

Jul. 14, 2020 (DE) .................... 10 2020 118 532.4

(51) Int. Cl.
*C03B 33/023* (2006.01)
*C03B 33/03* (2006.01)
(Continued)

(52) U.S. Cl.
CPC .......... *C03B 33/0235* (2013.01); *C03B 33/03* (2013.01); *C03B 33/033* (2013.01); *C03B 33/037* (2013.01); *C03B 35/14* (2013.01)

(58) Field of Classification Search
CPC ... C03B 33/0235; C03B 21/00; C03B 33/033; C03B 33/02; C03B 33/03; C03B 17/06;
(Continued)

(56) References Cited

U.S. PATENT DOCUMENTS 3,244,337 A * 4/1966 Curtze .................. C03B 33/027
83/402
3,932,726 A * 1/1976 Verheyen .............. C03B 33/093
219/121.72

(Continued)

FOREIGN PATENT DOCUMENTS

CN  109912238  6/2019
CN  109982950  7/2019
(Continued)

*Primary Examiner* — Erin Snelting
*Assistant Examiner* — Steven S Lee
(74) *Attorney, Agent, or Firm* — Ruggiero McAllister & McMahon LLC

(57) ABSTRACT

A method for the production of glass ribbon portions is provided that includes: transporting a glass ribbon at a velocity $v_1$, wherein the velocity $v_1$ is dependent on the predetermined glass thickness ($d_1$), with the application of a tensile stress parallel to the edges of the glass ribbon, in a plane $E_1$, and cooling the glass ribbon at a cooling rate that is dependent on the predetermined glass thickness ($d_1$), inserting a score on the surface of the glass ribbon in at least one edge area by scoring the glass surface with a scoring tool, wherein the score has an angle a to the transport direction of the glass ribbon, deflecting the glass ribbon in a plane $E_2$ to generate a bending stress and separating a glass ribbon portion with the formation of edges by breaking the glass ribbon on the extension of the score running transversely to the glass ribbon.

23 Claims, 7 Drawing Sheets

(51) Int. Cl.
*C03B 33/033* (2006.01)
*C03B 33/037* (2006.01)
*C03B 35/14* (2006.01)

(58) Field of Classification Search
CPC ... B26D 7/32; B65H 2301/121; B65G 49/064
See application file for complete search history.

(56) References Cited

U.S. PATENT DOCUMENTS

| | | | | |
|---|---|---|---|---|
| 4,049,167 | A * | 9/1977 | Guissard | C03B 33/033 225/2 |
| 6,502,423 | B1 * | 1/2003 | Ostendarp | C03B 17/068 65/176 |
| 7,975,581 | B2 * | 7/2011 | Benischke | C03B 33/037 83/72 |
| 8,677,783 | B2 * | 3/2014 | Abramov | C03B 21/00 65/97 |
| 9,399,595 | B2 * | 7/2016 | Furuta | C03B 33/033 |
| 9,643,878 | B2 * | 5/2017 | Fujii | C03B 23/023 |
| 2004/0000045 | A1 * | 1/2004 | McEntee | C03B 33/033 29/458 |
| 2010/0162758 | A1 * | 7/2010 | Lang | C03B 33/0235 65/29.11 |
| 2011/0177325 | A1 * | 7/2011 | Tomamoto | B32B 17/10 65/193 |
| 2014/0130649 | A1 * | 5/2014 | Chang | C03B 33/033 83/26 |
| 2015/0299019 | A1 * | 10/2015 | Fujii | C03B 33/082 65/165 |
| 2016/0068424 | A1 * | 3/2016 | Renz | C03B 33/107 225/2 |
| 2017/0369356 | A1 * | 12/2017 | Booth | C03B 33/0235 |
| 2018/0134605 | A1 * | 5/2018 | Aburada | C03B 33/0235 |
| 2018/0222790 | A1 * | 8/2018 | Fotheringham | C03C 10/0054 |
| 2018/0362388 | A1 * | 12/2018 | Bayne | C03B 17/064 |
| 2019/0148768 | A1 * | 5/2019 | Visco | C03B 23/037 65/106 |
| 2019/0160788 | A1 | 5/2019 | Deneka | |
| 2019/0161402 | A1 | 5/2019 | Harris | |
| 2020/0223735 | A1 | 7/2020 | Brown | |
| 2021/0292221 | A1 | 9/2021 | Fournel | |

FOREIGN PATENT DOCUMENTS

| | | | |
|---|---|---|---|
| DE | 102014013262 | 3/2016 | |
| FR | 2532298 A1 * | 3/1984 | ........ C03B 33/033 |
| JP | S58104030 | 6/1983 | |
| TW | 201920019 | 6/2019 | |
| TW | 201938377 | 10/2019 | |
| WO | WO-2008020509 A1 * | 2/2008 | ........... B24B 9/10 |
| WO | WO-2017040128 A1 * | 3/2017 | ....... C03B 33/0235 |
| WO | WO-2017142823 A1 * | 8/2017 | ....... C03B 33/0215 |
| WO | 2019055751 | 3/2019 | |
| WO | WO-2019055751 A1 * | 3/2019 | ......... B65G 49/061 |

* cited by examiner

DEVICE AND METHOD FOR LENGTH CUTTING IN ULTRATHIN GLASSES

CROSS REFERENCE TO RELATED APPLICATIONS

This application claims benefit under 35 USC § 119 of German Application DE 10 2020 118 532.4 filed Jul. 14, 2020, the entire contents of which are incorporated herein by reference.

BACKGROUND

1. Field of the Invention

The present invention relates to the production of glass ribbon portions or sheets from extremely thin glass or ultra-thin glass, i.e., glasses with a glass thickness in the range from 15 µm to 150 µm by inserting predetermined breaking lines and then applying bending stress to separate individual glass ribbon sections in the cross direction of a glass ribbon. The invention also relates to a corresponding device for producing glass ribbon portions from ultra-thin glass.

2. Description of Related Art

In methods for cutting or separating glasses, a score or scratch is first created as a predetermined breaking point in the glass surface over the entire width of the glass with a scoring tool. Then a bending stress is applied by bending the glass, which causes the glass to break with the formation of edges along the score. However, the breakage is difficult to control due to its high speed, especially in the case of ultra-thin glass, and uncontrolled breakage and splintering can easily occur here by introducing an energy that is greater than the energy required to form the breaking edge.

When separating glass ribbon portions or glass sheets from a continuous glass ribbon, the glass ribbon is also moved lateral to the scoring direction. Hence, the minimum length of a glass sheet that can be achieved depends on the feed rate of the glass and the duration of the cutting process. The duration of the cutting process results from the times for the back and forth travel of the cutting axis as well as the time required for the synchronization of the cutting tool. This means that there is a shortest sheet size for every belt speed, which can't be undercut.

The draw rate and thus the feed rate of the glass ribbon increases with decreasing glass thickness. For thin glasses, depending on the respective glass thickness, this results in feed rates of 0.5 to 50 m/min, so that, for example, for glasses with a thickness of 50 µm, the shortest cutting dimension is above 690 mm. For glasses with a thickness of 30 µm, the shortest cutting dimension is already above 1000 mm. However, glass sheets with a maximum length of 500 mm are usually desired.

In addition to the large, shortest cutting dimensions described above, the high feed rates also result in the problem that sufficient cutting quality cannot be ensured when a score is made across the entire width of the glass.

In DE 10 2014 013 262 A1, a cutting method for thin glass is therefore described in which the score or scratch is not carried out over the entire width of the glass ribbon, but only in the rim of the glass ribbon. Furthermore, the use of a rotating cutting wire means that synchronization is not necessary, so that overall the duration of the cutting process can be shortened. After the scoring, the edges are formed by bending the glass and the corresponding glass portion is separated from the glass ribbon and fed to a collecting container. The disadvantage of the DE 10 2014 013 262 A1, however, is that it is not possible to adjust the bending stress precisely. Furthermore, the device described in DE 10 2014 013 262 A1 does not offer any possibility of separating the glass ribbon portions from each other.

SUMMARY

The invention is therefore based on the object of providing a method for producing glass ribbon portions from ultra-thin glass which does not have the drawbacks described above. In particular, the production method according to the invention is also intended to enable the production of glass ribbon portions in the form of glass sheets of variable length and high yields. A further object of the invention is to provide an apparatus for producing glass ribbon portions of thin glass due to process-reliable machine intersection, in particular with a high process yield.

The invention provides a method for the production of glass ribbon portions with at least the following steps: (a) Hot forming of a continuous glass ribbon with a specific glass thickness ($d_1$) in the range from 15 µm to 150 µm from a glass melt and cooling of the glass ribbon at a cooling rate that is dependent on the specified glass thickness ($d_1$), (b) Transport of the glass ribbon at a velocity $v_1$, thereby applying a tensile stress parallel to the edge regions of the glass ribbon, (c) Redirecting the glass ribbon into a level $E_1$, (d) Transport of the glass ribbon in level $E_1$ at velocity $v_1$, (e) Insertion of a score on the surface of the glass ribbon in at least one edge region of the glass ribbon by scoring the glass surface, the scoring being carried out by a scoring tool at an angle α to the transport direction of the glass ribbon, (f) Guiding the glass ribbon in a plane $E_2$ to generate a bending stress, wherein the glass ribbon is being transported in the plane $E_2$ at a velocity $v_2$, wherein the planes $E_1$ and $E_2$ are being arranged in relation to one another so that the glass ribbon is subjected to a bending stress when it is transferred from the first to the second transport unit and the bending radius is set by the difference in position between the planes $E_1$ and $E_2$ and/or the difference between the velocities $v_1$ and $v_2$, and (g) Separation of a portion of glass ribbon with the formation of edges through spontaneous cracking of the glass ribbon at the extension of score running across the glass ribbon in lateral direction.

According to one embodiment, the velocity $v_1$ is set as a function of the desired glass thickness $d_1$.

Steps c) and d) can take place immediately one after the other, but embodiments are also possible in which steps c) and d) take place spatially and/or temporally separated from one another. For example, the glass ribbon can be wound up after step c) and a roll thus produced can be fed to steps d) to g) at a later point in time.

The planes $E_1$ and $E_2$ are arranged in relation to one another in such a way, that during the transition from the first to the second transport unit, the glass ribbon is subjected to bending stress. In particular, the two planes $E_1$ and $E_2$ show different positions. Preferably, the planes $E_1$ and $E_2$ show an offset. Alternatively or additionally, the two planes $E_1$ and $E_2$ have an angular offset. In embodiments with an offset between the two planes $E_1$ and $E_2$, these show a height difference Δh in the z-direction. In the context of this disclosure, the z-direction denotes the vertical direction. Different z-coordinates therefore denote different heights. Preferably, the plane $E_2$ is located below the plane $E_1$. In particular, the height difference Δh is designed as a step.

According to a preferred embodiment, the two planes $E_1$ and $E_2$ have a height difference $\Delta h$ and are aligned parallel to one another, i.e., there is no angular offset between them.

According to one embodiment, the glass ribbon portion is separated from the glass ribbon after step g) in step h) by being transported with a rate of feed $v_2$, wherein $v_2 \geq v_1$ preferably applies to the velocities $v_1$ and $v_2$. Depending on the difference in position between the two planes $E_1$ and $E_2$, for example, if the two levels have a relatively large difference in height $\Delta h$, the separation of the glass ribbon portion from the glass ribbon can also take place when the feeding rate $v_2$ is smaller than the feeding rate $v_1$.

Alternatively or additionally, according to another embodiment of the invention, the individual glass ribbon portions can be separated from one another by transporting them with a feeding rate $v_3$, wherein $v_3 > v_1$ applies to the velocities $v_1$ and $v_3$.

The rims or edge regions of the glass ribbon can be designed as thickened edge regions. The bead-like thickenings on the two edge regions in the longitudinal direction of the glass ribbon are understood as edgings. Within the edgings, the glass ribbon has a glass thickness $d_2$ which is greater than the thickness $d_1$ in the middle of the glass ribbon. In particular, the following applies to the thickness of the edgings $d_2$ and to the glass thickness of the glass ribbon $d_1$: $d_2 > 4\ d_1$.

In one embodiment of the invention, the glass ribbon has areas with edgings and in step e) the scoring takes place in at least one edging of the glass ribbon. The scoring in the edging is particularly advantageous since in these areas, the glass ribbon has a higher mechanical strength than in the glass center area due to the greater glass thickness.

The feeding rate $v_1$ at which the glass ribbon is transported in step d) is set as a function of the desired glass thickness and corresponds to the drawing rate of the shaping device. The glass ribbon is drawn in the y-direction in a plane $E_1$ by applying a tensile stress parallel to the glass edgings. The tensile stress applied in plane $E_1$ does not correspond to the tensile force in the hot forming process of step b), since in step d) only the force for the transport in the y-direction, i.e., the horizontal transport, has to be applied. According to one embodiment, the glass ribbon is drawn quickly in step a) in a down-draw process, preferably with a speed in the range from 1 m/min to 50 m/min. However, the method is not limited to the down-draw method. For example, drawing using the overflow fusion process or other processes that are suitable for producing thin glass ribbons are also possible.

According to one embodiment, the glass ribbon is cooled in step a) by passive cooling, i.e., the heat is given off to the environment by convection or thermal radiation. The cooling rate depends on the specified glass thickness.

An alternative embodiment provides that the glass ribbon is actively cooled following the shaping. Particularly, cooling rates of at least 10 K/s are being used. However, the cooling rate can also be significantly higher. According to one embodiment of the invention the cooling rate is at least 40 K/s. With a given smaller thickness of the glass ribbon, the cooling rate is increased. According to a further embodiment, cooling takes place in step b) with a thickness-dependent cooling rate, wherein the cooling rate lies in the range from $(1/d)*5$ K/min*µm to $(1/d)*280$ K/min*µm. According to a preferred embodiment, the cooling rate lies in the range from 120 to 260 K/min*µm. In this embodiment, the glass ribbon is preferably cooled in a controlled manner in a cooling furnace, in particular with heating and cooling elements. For this purpose, the device can have a cooling furnace in front of the first transport device.

The inventors have surprisingly found that rapid cooling has an advantageous effect on the separation process. Rapid cooling leads to the build-up of compressive stress in the glass surfaces. Due to the compressive stress in the glass, the resulting crack does not spontaneously continue in the x-direction when the scoring in step e) occurs. The break at the crack or score only occurs in step f) when a bending stress is applied. Hence, the process can be better controlled. While compressive stress is disadvantageous in conventional cutting processes, the build-up of compressive stress in the process according to the invention thus leads to improved control of the cutting process and thus also to an increased process yield.

In the following step c) the glass ribbon is deflected. According to one embodiment, it is deflected in such a way that it is no longer transported vertically, i.e., in the z-direction, but in the y-direction. In step d), the glass ribbon is transported in a plane $E_1$. The feeding rate corresponds to the drawing rate $v_1$.

The separation of the glass ribbon portions with the formation of edges from the glass ribbon takes place in steps e) to h) by scoring the glass ribbon in at least one edging and applying a bending stress. This leads to a spontaneous break-off of the glass ribbon portion from the glass ribbon due to spontaneous crack propagation. Thereby, the fracture or crack runs along the main stress line. In step e) the glass ribbon is therefore scored in at least one edge region of the glass ribbon, preferably in at least one edging of the glass ribbon. The edge regions or rims are understood here to mean the areas in the vicinity of the edges of the glass ribbon. The scoring has an angle $\alpha$ to the transport direction or drawing direction of the glass ribbon. After applying the bending stress, the break off takes place at an angle $\alpha$ to the main drawing direction. In order to obtain right-angled or at least largely right-angled glass ribbon portions, the angle $\alpha$ preferably lies in a range from 80 to 100°. In particular, the angle $\alpha$ is 90°.

In the method according to the invention, it is not necessary, before the bending stress is applied, to generate a transverse or lateral predetermined breaking line which extends over the entire width of the glass ribbon. Rather, to obtain a breaking edge after applying a bending stress, which has an angle $\alpha$, preferably an angle $\alpha$ of 90°, to the main drawing or transport direction of the glass ribbon, is is only necessary to apply a score in one of the two edgings of the glass ribbon with small lateral dimensions in order. Since the crack propagates along the bending edge and the bending edge has an angle of 90° to the transport direction, right-angled or at least largely right-angled glass ribbon portions can also be obtained if the angle $\alpha$ deviates from 90°. According to a preferred embodiment, the length of the crack or score lies in the range from 2 to 6 mm.

Due to the small lateral extent of the score, the times for the outward and return travel of the cutting axis are considerably reduced. When using a synchronized cutting tool, the duration of the synchronous travel is also reduced. As a result of the significantly shortened process duration of the scoring process, a method is provided which enables short cutting dimensions even at high belt speeds. Thus, with the method according to the invention, glass sheets with a glass thickness in the range from 15 µm to 150 µm can be produced, which have a cutting dimension of only 500 mm or even less than 500 mm.

According to a further development of the invention, a scoring tool is used in step e), which is set at an angle $\beta$ to the edge. The angle $\beta$ is set as a function of the feeding rate $v_1$ in such a way that the movement of the glass ribbon in the y-direction due to the transport rate $v_1$ during the scoring process is compensated. The angle $\beta$ is in particular adapted to the drawing or feeding rate $v_1$ of the glass ribbon and the cutting speed of the scoring tool $v_{score}$, so that the scoring has an angle $\alpha$ in the range from 80 to 100°. The following applies to the angle $\beta$ to be set $\beta$=arccos ($v_1/v_{score}$). In this embodiment, a synchronous of the scoring device with the glass ribbon can therefore be dispensed with, so that the process duration in step e) can be additionally shortened.

Alternatively or additionally, another embodiment of the invention provides using an elastic tool carrier. Due to the elasticity of the tool carrier, the scoring tool is so flexible that it can adapt to the differential speeds of the glass surface transversely to the cutting direction. Hence, no synchronization is necessary. According to an advantageous embodiment, the scoring tool is set at an angle $\beta$ in the range from 40 to 70° to the edgings. The large tolerance of the angle $\beta$ to the angle $\alpha$ is made possible by the elasticity of the scoring device. According to this further development, therefore, there is also preferably no synchronization of the scoring tool with the glass ribbon.

The glass ribbon scored in step e) is subjected to bending stress in a subsequent step f). The bending stress is achieved by guiding the glass ribbon from the plane $E_1$ at a velocity $v_1$ to a plane $E_2$. The planes $E_1$ and $E_2$ have different positions. Thus, the planes $E_1$ and $E_2$ can have an offset, that is to say a height difference $\Delta h$. In this embodiment, the plane Elis preferably located below the plane $E_1$. Thus, the glass ribbon is guided downwards in the z-direction and is bent by gravity. Another embodiment provides that the planes $E_1$ and $E_2$ are positioned with an angle to one another. In this case, there can additional be an offset in the form of a height difference. Furthermore, the velocities $v_1$ and $v_2$ at which the glass ribbon is transported in the planes $E_1$ and $E_2$ can differ. By choosing the velocity $v_2$ or the difference between the transport rates $v_1$ and $v_2$, the bending radius can be influenced. In particular, $v_2>0$ applies to the feeding rate $v_2$. According to a preferred embodiment, $v_1<v_2$ applies here. This also enables a separation of the glass ribbon portion from the glass ribbon and a separation of the individual glass sheets from one another. Alternatively, however, the following can apply for the feeding rates $v_1$ and $v_2$: $v_1=v_2$.

According to one embodiment of the invention, the transport devices are designed as belts which are guided over pulleys. In these embodiments, the minimum bending radius is predetermined by the radius $D_1$ of the deflection rollers of the first transport device. By varying the offset of the planes $E_1$ and $E_2$, for example by varying the height difference $\Delta h$ and/or the difference between the speeds $v_1$ and $v_2$, the bending radius and thus the applied bending stress can be fine-tuned.

According to one embodiment of the invention, the height difference $\Delta h$ between the two planes $E_1$ and $E_2$ lies in the range between 75 to 225 mm, preferably 150 to 200 mm. The greater the height difference $\Delta h$ is selected, the better the glass ribbon fits the specified bending radius $D_1$ and the greater the time lag to the previous portion of the glass ribbon. A greater time delay and thus the distance to the previous glass ribbon portion in turn enables the second transport device to run at a lower feeding rate $v_2$. This in turn has the effect that the glass ribbon can lie even better against the deflection rollers and thus the actual bending radius can further approximate the minimum bending radius $D_1$.

In particular, it applies to the ratio of the two velocities $v_1/v_2$ that this is in the range from 0.95 to 1.05, preferably in the range from 0.9 to 1.1.

In a further embodiment of the invention, the scoring takes place in at least one of the two areas build by the edgings from the inner side of the edging in the direction of the edge region or rim of the glass band. In this case, only one of the edgings of the sheet can be scratched or both of said areas of the glass ribbon can be scored. Scoring only on one side is preferred. The edging has a characteristic cross-sectional profile in which the glass thickness increases slowly from the inside to the outside in the direction of the glass ribbon rims. The scoring tool follows this rise by scoring from the inside out.

In particular in the case of very thin glass ribbons, the weight of the glass ribbon itself is sufficient to bend the glass ribbon by gravity at the transition from the first level $E_1$ to the second level $E_2$. A further embodiment provides that in step f) the bending radius of the glass ribbon is additionally set by contact of the glass ribbon with at least one guiding wheel. The contact point A between the glass ribbon and the guiding wheel lies preferably in the plane $E_1$. The guiding wheel or the guiding wheels are preferably positioned in the area of the edges of the sheet of the glass ribbon. The guiding wheel is being driven with a peripheral velocity $v_{wheel}$ wherein the the peripheral velocity $v_{wheel}$ is faster than the feeding rate $v_1$ of the first transport device, so that a stop pulse cannot occur when the glass ribbon touches the guide wheel.

The embodiment described above is particularly advantageous when separating relatively thick glass ribbons with a thickness in the range from 80 to 150 μm. In the case of glass ribbons in the thickness range mentioned above, the rigidity of the glass can lead to the fact that bending processes do not occur or the bending processes occur too late due to gravity alone, i.e., without further mechanical aids. By means of the above-described further embodiment, the bending radius and the additional bending stress can thus also be set precisely in the case of thicker glasses, in particular in the case of glasses with a thickness in the range from 80 to 150 μm.

Another embodiment provides that in a step i) subsequent to step d) the areas of the glass ribbon build by the edgings are trimmed. This can be done in particular by a laser cutting process. Corresponding glass ribbon portions without edgings can be rolled up, for example. Here, according to one embodiment, the edgings are trimmed in the area of the plane $E_2$, i.e., after the breaking edge transversely to the transport direction has been formed. This offers the advantage that the scoring can be made in the area of the edgings. Another embodiment, however, provides that the edgings are removed before step e). In these embodiments, the scoring takes place in the edge regions of the trimmed glass ribbon.

Steps f) to h) of the manufacturing process are preferably repeated several times, so that a number of glass ribbon portions are produced accordingly. According to a further embodiment of the invention, the individual glass ribbon portions are packed by machine in a step j) following step h). Here, the glass ribbon sections are fed to a packaging station by a third transport device at a feeding rate $v_3$.

According to a variant of the invention, the individual glass ribbon portions are transported from the third transport device to the packaging station, preferably with the aid of robots, onto a stacking platform of the packaging station. Here, glass ribbon portions and paper sections are alternately stacked on the stacking platform. The paper section in the form of a sheet of paper is preferably placed on the upper glass ribbon portion of the stacking platform from a paper feed device with the aid of a further robot. During the transfer of the glass ribbon portions and paper sections, the stacking platform moves downward by the amount of the glass ribbon portions thickness or the paper section thickness with each transfer.

According to an advantageous embodiment of the invention, the transfer of the glass ribbon portions from the third transport device to the stacking platform takes place via a porous plate, in particular via a porous plate made of plastic, to which a vacuum is applied. Uniform suction of the glass ribbon section is thus ensured and prevents high suction or tensile forces from acting on the glass ribbon portions at specific points. This means that even very thin glass portions can be transferred from the third transport device to the stacking platform without the risk of breakage.

Another variant of the invention, however, provides that the glass ribbon portion obtained in step g) has a length in the range from 100 to 200 m, preferably in the range from 100 to 1000 m, and the glass ribbon portion and a paper tape are rolled up together in a step k) following step h). This variant is particularly suitable for glass ribbon portions from which the edgings have been removed in a previous process step.

The invention also relates to a device for producing glass ribbon portions with a predetermined thickness $d_1$ in the range from 15 μm to 150 μm, in particular for the above-described method according to the invention. The device thereby comprises at least two, preferably three transport devices for transporting the glass ribbon. The transport devices having a width $b_1$ that is greater than the width $b_2$ of the glass ribbon and provide at least one device for scoring the glass ribbon in the area of the first transport device.

Particularly belt straps have proven to be advantageous as transport devices. Because the width $b_1$ of the belt straps is greater than the width $b_2$ of the glass ribbon, the belt straps offer the glass ribbon a full-surface support. The individual belt straps are driven independently of one another. This enables to set the transportations rates at the individual glass ribbons independently of one another. The belt straps are guided through pulleys. The diameter of the pulleys also defines the smallest possible bending radius. Deflection pulleys with a diameter in the range from 40 to 150 mm have proven to be particularly advantageous.

In the device, the second transport device or the second belt strap is located after the first transport device and, if necessary, in front of the third transport device. The glass ribbon is transported from the first transport device to the second transport device. Thus, the second transport device is arranged behind the first transport device in the direction of drawing, resp. the feeding direction and the third transport device is arranged behind the second transport device in the feeding direction. The first and second transport devices are arranged with respect to one another in such a way that a bending stress is built up in the glass ribbon during transport from the first to the second transport device.

The first transport device is driven with a feeding rate $v_1$, wherein $v_1$ corresponds to the velocity of the drawing machine and the second transport device is driven with a feeding rate $v_2$. According to one embodiment of the invention, the velocities of the individual transport devices are set in such a way that the velocities of the first and second transport devices differ from one another. Alternatively, the first and second transport devices can also be driven with the same transportation rate.

In embodiments with a third transport device, this is driven with a feeding rate $v_3$. In this case, the velocity $v_3$ of the third transport device is preferably greater than the velocity $v_1$ of the first transport device. This ensures that the broken edges of the individual glass ribbon portions do not collide with each other. The third transport device runs at least so much faster than the first transport device that the individual glass ribbon portions are sufficiently separated. Sufficient separation is further important for a subsequent packaging process.

According to an advantageous embodiment, an inspection system is located in the area of the first transport device to detect defects in the glass ribbon. If a defect in the glass ribbon is found, the corresponding area of the glass ribbon can be cut out by the cutting processes described above or the corresponding defective glass sheets can be sorted out in subsequent process steps.

Alternatively or additionally, a further embodiment provides that a device for measuring the thickness of the glass ribbon. This is arranged in the area of the first transport device. A further development provides that the glass ribbon is produced with a device for hot forming a continuous glass ribbon from a glass melt by means of a drawing machine. Here, the device for measuring the thickness is connected to the device for hot forming so that the drawing speed of the drawing machine is regulated in dependence of the the the measured glass thickness.

In the area of the first transport device or the first belt strap, at least one device for scoring the glass ribbon is arranged. Preferably, the device for scoring is being arranged in the end region of the first transport direction, which is followed by the second transport device.

The scoring device is aligned such that the scoring takes place at an angle $\alpha$ in the range from 80 to 100°, preferably at an angle of 90°, to the feeding direction of the glass ribbon. Due to the short length of the scoring, the times for the outward and return journey are almost completely eliminated. The time for synchronous travel is also reduced accordingly. In this way, short portions of glass ribbon or short glass sheets or short glass plates can be produced even at high feeding rates. The scoring tool is preferably positioned in such a way that the glass ribbon is scored in the edge region of the glass ribbon or in the area build by edgings. According to one embodiment, the score has a lateral extent in the range from 2 to 6 mm. The score is therefore 2 to 6 mm long.

In one embodiment, the first and the second transport devices show a height difference $\Delta h$ in the z-direction, i.e., perpendicular to the transport direction. The second transport device is located lower than the first transport device. According to one embodiment of the invention, the height difference $\Delta h$ is designed as a step. The height difference $\Delta h$ is preferably in the range from 75 to 225 mm. Preferably, the planes $E_1$ and $E_2$ show no angle difference.

Due to the height difference $\Delta h$ between the first and the second transport device, the glass ribbon is subjected to a bending stress at the transition from the first to the second transport device. This causes the formation of a breaking edge through spontaneous crack propagation starting from the score along the line of main tensile stress. The angle $\alpha$ thus forms a right-angled glass ribbon section with the formation of edges.

The bending stress can be adjusted by the respective height difference $\Delta h$ between the first and the second transport device as well as by the difference between the feeding rates $v_1$ and $v_2$ of the first and second transport device. Here, the bending radius of the glass ribbon at the transition from the first to the second transport device can be set using the velocities rates $v_1$ and $v_2$ or their difference. If the second transport device runs with a feed rate which is lower than the speed of the first transport device, a relatively small bending radius is formed. If, on the other hand, the first transport device runs more slowly than the second transport device, a larger bending radius is formed.

Alternatively or additionally, the first and second transport devices can also have an angular offset.

According to a further development, the device for scoring the glass ribbon is designed in such a way that synchronous travel is no longer needed. By eliminating the synchronous travel, the duration of the cutting process can be further reduced. The omission of synchronous travel can be implemented in different ways. One embodiment provides that the scoring device is placed at an angle β to the transport direction of the glass ribbon. Here, the angle β function of the feeding rate $v_1$ of the first transport device so that the generated score shows an angle α to the transport direction of the glass ribbon, which lies in the scope of the invention.

In an other scoring device, which does not require synchronous travel, the tool for scoring is arranged on an elastic tool carrier. The elastic tool carrier is arranged on a rotating disk. In particular, the tool carrier is designed as an elastic arm. A diamond or diamond dust that is applied to the tool carrier can be used as a tool for scoring, for example. To scratch the edging, the rotating disk makes a 360° turn, whereby the elastic arm with the diamond or diamond dust just touches the edging. Due to the elastic arm, the scoring tool can run with the glass ribbon, so that an inclined axis is formed. Due to the elastic arm, this scoring tool thus has more degrees of freedom than a static scoring tool. According to one embodiment, the elastic tool is located on the glass ribbon at an angle β in the range from 40 to 70° to the drawing direction the glass ribbon or to the edgings of the glass ribbon.

A variant of the device provides that the device has a device for mechanically deflecting the glass ribbon at the end of the first transport device. The deflecting device preferably comprises at least two guiding wheels. The guiding wheels or guiding rollers are mounted on a common shaft which has its own drive. Here, according to one embodiment, the height of the shaft and its distance from the step between the first and second transport device can be adjusted. Here, the deflection device performs a 360° rotary movement with a rotational velocity $v_{wheel}$. The rotational velocity $v_{wheel}$ is preferably set in such a way that it is greater than the feeding rate $v_1$ of the first transport device, so that when the glass ribbon is touched, a stop pulse is avoided. Due to the additional mechanical deflection of the glass ribbon, also glass ribbons in the thickness range from 80 to 150 μm can be bent with a specified bending radius, while glass ribbons with this thickness will, due to the stiffness of the glass ribbon, not bend due to gravity alone or a bend occurs too late.

According to a further development of the invention, the device has a device for trimming the edgings in the area of the first or the second transport device. This device is preferably designed to cut off edgings by means of laser cutting.

A further development of the device comprises a third transport device and at least two packaging stations in the area of the third transport device. Due to the relatively high process speed and in particular the velocity $v_3$ of the third transport device, at least two packaging stations are necessary, which alternately stack the individual glass ribbon portions or the individual glass sheets from the third transport device. Each packaging station preferably comprises at least two robots, a stacking platform and a paper feed system. The first robot stacks a portion of glass ribbon from the third transport device onto the stacking platform. The second robot places a sheet of paper, which has previously been provided by the paper feed device, onto the topmost glass ribbon portion or onto the topmost glass sheet of the stacking platform. The stacking platform can be moved in the z-direction and moves downwards by the thickness of the glass sheet and paper after each stacking process. In this way, glass-paper stacks of 100 to 500 pieces can be produced and then fed to the final packaging.

The first robot of the packaging station for lifting the glass plates preferably comprises a porous plate, preferably a porous plastic plate, to which low pressure is applied.

According to one embodiment of the device, it has a funnel at the end of the third transport device, in which glass sheets with glass defects are guided. These get through the funnel into a collecting container below the production level. There is a higher air pressure within the production level, so that no glass dust from the collecting container reaches the production level.

In another embodiment of the device, it has a packaging station in the area of the third transport device, in which the glass ribbon section is rolled up together with a paper roll. This device preferably also has a device for removing the edgings in the area of the first or second transport device. In this embodiment of the device, preferably glass ribbon sections without edgings, in particular with a length in the range from 100 to 2000 m, preferably in the range from 100 to 1000 m, are rolled up in the packaging or roll station.

BRIEF DESCRIPTION OF THE FIGURES

The invention is explained in more detail below with reference to FIGS. 1 to 13.

DETAILED DESCRIPTION

Figure 1:
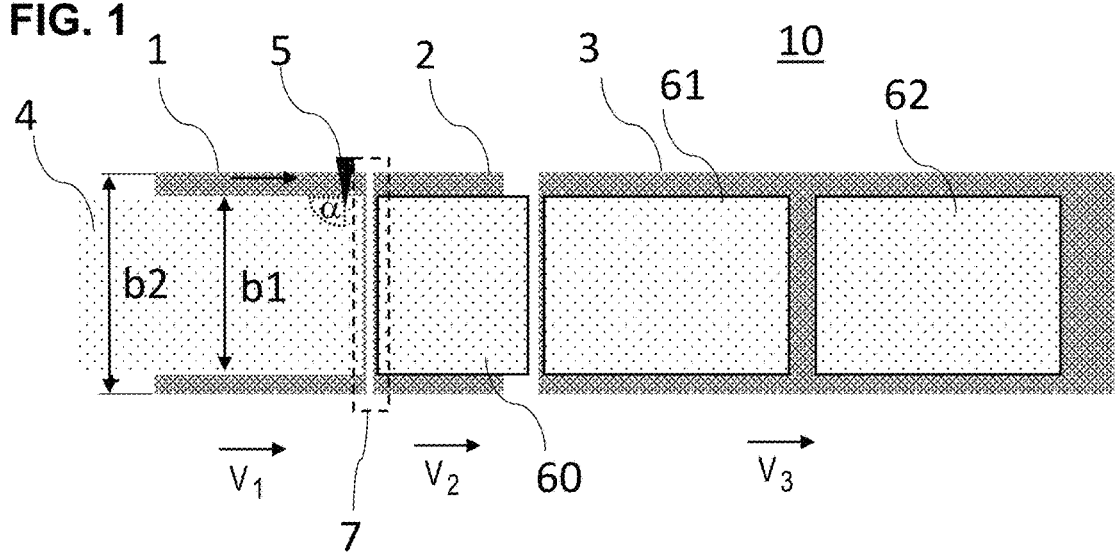
FIG. 1 shows the schematic representation of an embodiment of the device according to the invention in a top view.
Figure 2:
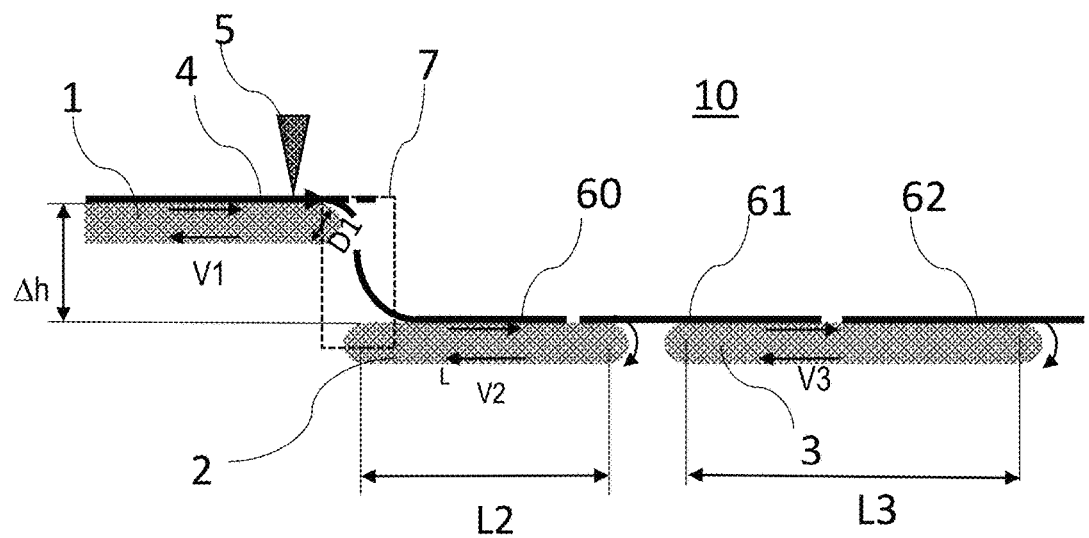
FIG. 2 is a schematic representation of the embodiment shown in FIG. 1 in side view.

FIGS. 1 and 2 show a schematic representation of an embodiment of the device according to the invention in a plan view (FIG. 1) or in a side view (FIG. 2). The device of this embodiment comprises the three transport devices 1, 2 and 3, which are designed as belts and are guided over pulleys. The deflecting pulleys preferably have a diameter $D_1$ in the range from 40 to 150 mm. The belt straps 1, 2 and 3 have a width $b_2$ which is greater than the width $b_1$ of the glass ribbon 4, so that the glass ribbon 4 is completely supported by the belt straps. The glass ribbon 4 has a thickness in the range from 15 to 150 µm, wherein the glass thickness in the area of the edgings is greater than in the center of the glass and thus is also greater than 150 µm.

The belt straps 1, 2 and 3 are driven independently of one another at the velocities $v_1$, $v_2$ and $v_3$. Here, the first belt strap 1 and the second belt strap 2 run with the velocities $v_1$ and $v_2$. The velocity $v_1$ of the first belt strap corresponds to the drawing rate of the drawing machine which pulls the glass ribbon out of the mold (not shown) and is thus largely determined by the desired glass thickness $d_1$ of the glass ribbon 4. The drawing rate and thus also the velocity $v_1$ of the first belt strap or the first transport device increases with decreasing glass thickness $d_1$ of the glass ribbon 4. The velocity $v_3$ of the third belt strap ensures that the glass ribbon portions 60, 61, 62 are separated and the breaking edges of the individual glass ribbon portion 60, 61, 62 don't strike against each other. Preferably, the velocity $v_3$ is greater than the velocity $v_1$ of the first belt strap 1. The length $L_3$ of the third belt strap 3 is chosen so that there is sufficient space for packing stations (not shown).

At the end of the first transport device or the first belt tape 1, a scoring device 5 is positioned in a way that the glass ribbon 4 is scored in the area of the edgings. The score runs at right angles or at least approximately at right angles to the transport direction, which also represents the main drawing direction, and in particular has a length in the range from 2 to 6 mm.

The first belt strap 1 and the second belt strap 2 show an offset in height, i.e., in the z-direction, so that in area 5, i.e., between the first belt strap 1 and the second belt strap 2, a step with the height difference $h_1$ is formed. Due to the difference in height $\Delta h$ in the area 7 between the first strap 1 and the second strap 2, the glass ribbon 4 is subjected to a bending stress, which causes the glass ribbon 4 to break along the score, forming a glass edge, so that the endless glass ribbon 4 is divided into glass ribbon portions 60, 61, 62. The length of the glass ribbon portions 60, 61, 62 is determined by the time interval between two scoring processes. Here, the minimum length of the glass ribbon portions 60, 61, 62 is limited by the shortest possible time interval between two scoring processes. This time interval includes, for example, the times for the outward and return journeys of the scoring tool, the duration of the cutting process and, if applicable, the duration of a synchronous movement. Since in the method according to the invention the score is only 2 to 6 mm long, the time interval between two scoring processes can be kept very short. Hence, even very thin glass ribbons 4 can be divided into relatively short glass ribbon portions 60, 61, 62. Particularly in the case of embodiments in which synchronization of the tool can be dispensed with, the minimum panel length is no longer dependent on the minimum distance between two scores. It rather depends on the length of the glass ribbon 4, which still breaks independently when it is transferred over the radius to the plane $E_2$. Said corresponding glass ribbon length is in turn dependent on the relative position of the planes $E_1$ and $E_2$, in the exemplary embodiment shown thus on the height difference between the planes $E_1$ and $E_2$. Depending on this, the lower limit for the length of the glass ribbon portions or glass plates lies in the range from 150 to 250 mm.

The bending of the glass ribbon 4 takes place under its own weight. In the exemplary embodiment shown in FIGS. 1 and 2, the bending radius and thus also the bending stress are set by the height difference $\Delta h$ between the first belt strap 1 and the second belt strap 2. Furthermore, the bending radius and thus the bending stress can be fine-tuned by the ratio of the velocities $v_1$ and $v_2$ of the belt straps 1, 2. If the first belt strap 1 runs at a higher velocity than the second belt strap 2, a relatively small bending radius is created and vice versa.

Figure 3:
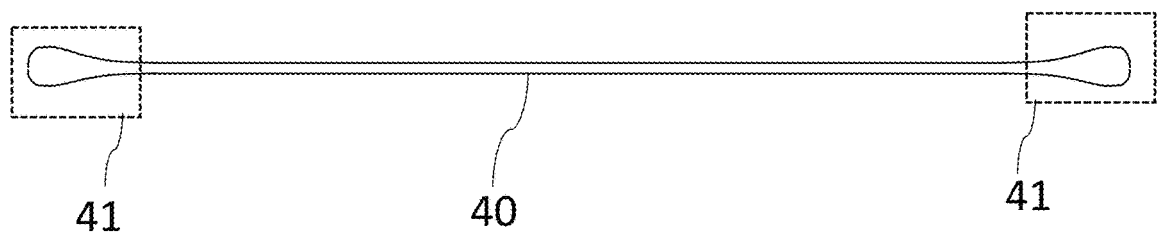
FIG. 3 shows the schematic representation of the cross-sectional profile of the glass ribbon.

FIG. 3 shows a schematic cross section through the glass ribbon 4. The glass ribbon 4 here has edgings 41 with an increased glass thickness $d_2$ at both edge regions, while the glass thickness $d_1$ in the central region 40 of the glass ribbon is significantly less. Preferably the glass is an aluminosilicate glass.

Figure 4:
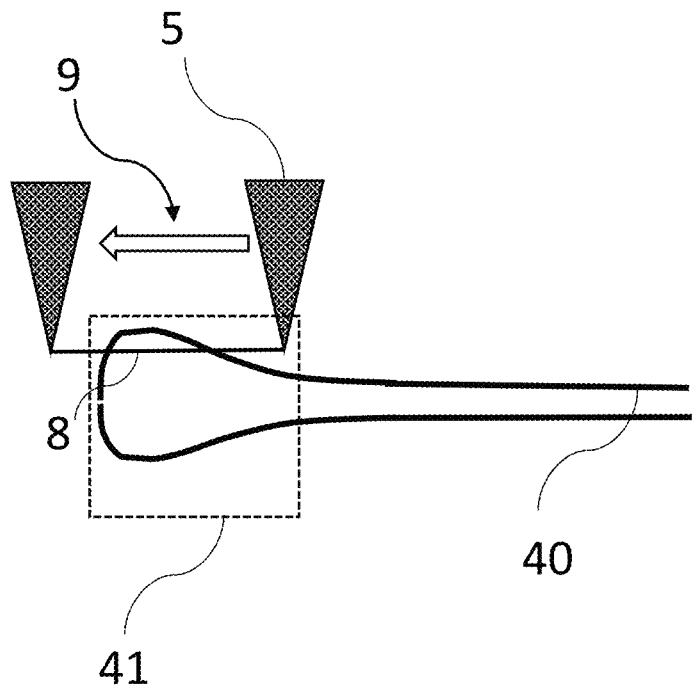
FIG. 4 shows a schematic representation of the position and scoring movement of the scoring tool.

The maximum glass thickness in the are of the edgings can be up to 5 times thicker than the glass thickness $d_1$ in the central area of the glass ribbon. The edgings 41 have an asymmetrical cross-sectional profile in which the glass thickness increases gently from the glass center 40 towards the edges of the glass ribbon. According to an advantageous embodiment of the method, the scoring tool 5 is therefore guided from the inside to the outside, i.e., towards the edge of the glass ribbon 4, in order to produce the scoring 8 in the edging 41. This is shown in FIG. 4. The arrow 9 here symbolizes the direction of movement of the scoring tool 5 during the scoring process.

Figure 5:
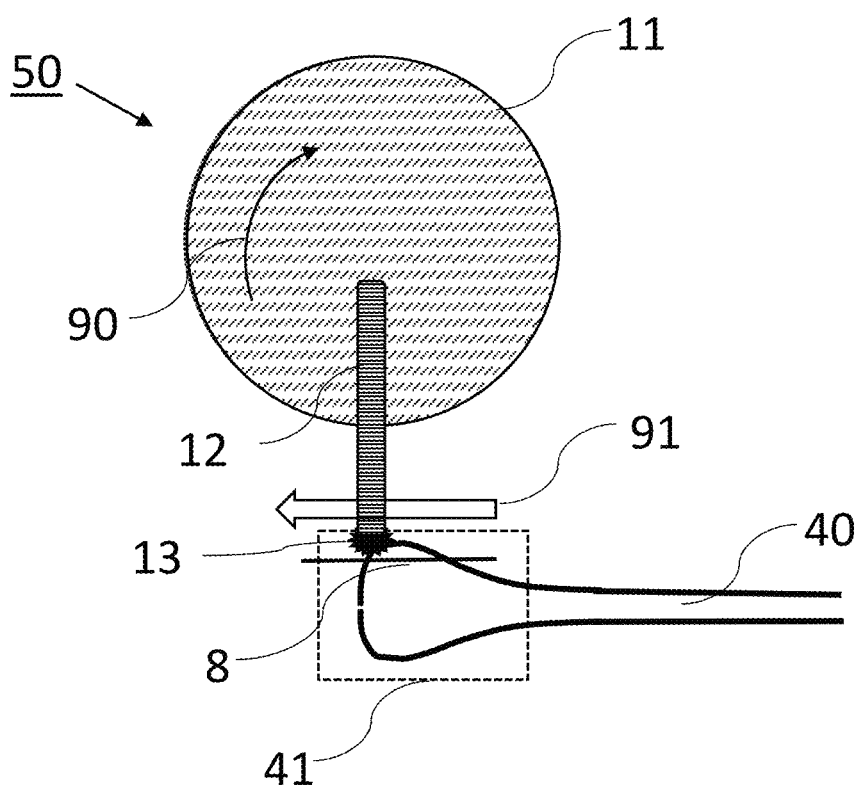
FIG. 5 shows a schematic representation of a scoring tool with an elastic arm.

FIG. 5 schematically shows a further embodiment of the scoring device 50 in side view. The scoring device 50 comprises a rotating disk 11 on which an elastic tool carrier 12 is arranged. The tool carrier 12 is designed as an elastic arm. At the other end of the tool carrier 12, the cutting or scoring tool 13 is arranged in the form of one or more hard material elements, for example a diamond or diamond dust, or diamond grains. By rotating the disk 11 (symbolized by the arrow 90), the cutting tool 13 generates the score 8. The cutting movement is symbolized by the arrow 91. Due to the elastic tool arm of the tool carrier 12, it can simultaneously execute the transport movement of the glass ribbon 4, so that the score 8 shows over its entire length an angle α of 90° to the transport direction of the glass ribbon 4. This eliminates the need for synchronous travel when using the scoring device 50. Further, an additional angle adjustment of the scoring tool adapted to the belt speed can take place. By eliminating the synchronization runs, the minimum time between two scoring processes can be further shortened and thus glass sheets with short minimum lengths can be obtained even with very thin glasses.

Figure 6:
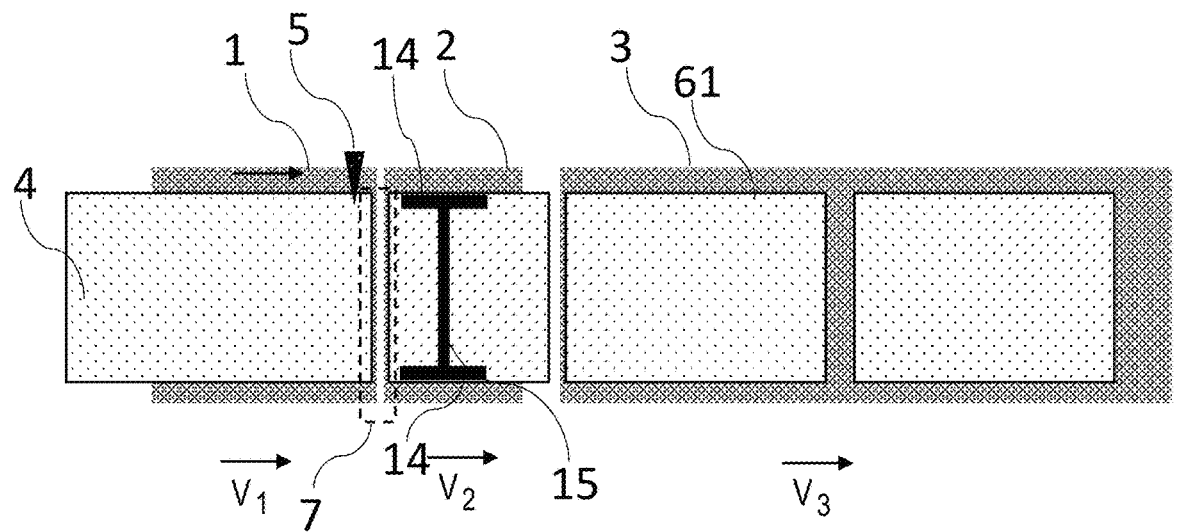
FIG. 6 shows a schematic representation of a further embodiment of the invention with an additional guide device in a plan view.
Figure 7:
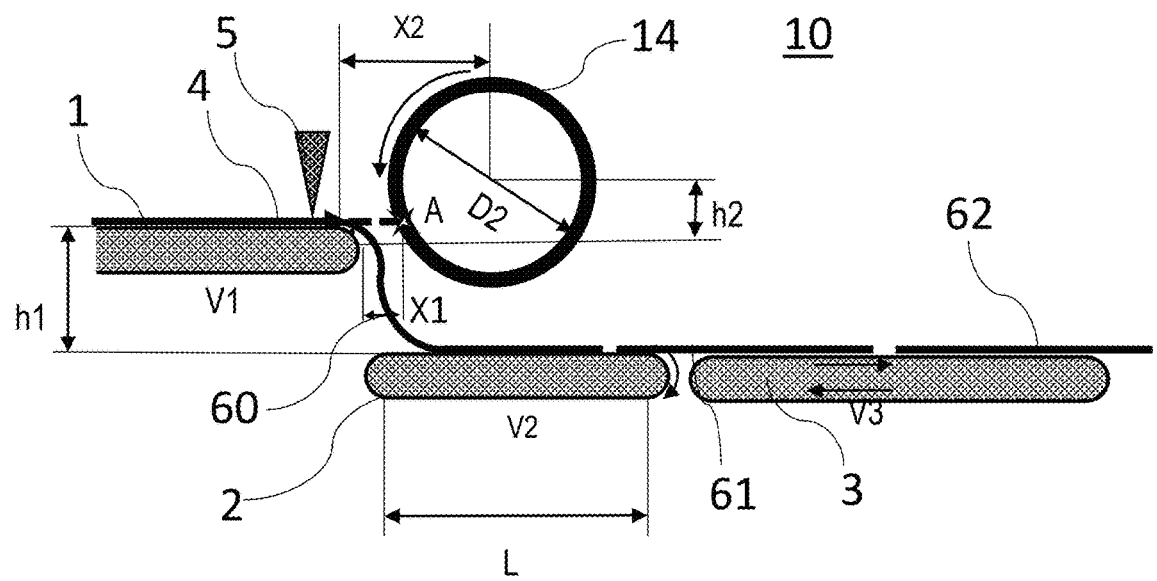
FIG. 7 shows a schematic representation of the further development shown in FIG. 6 in a side view.

In FIG. 6, a further embodiment of the device according to the invention is shown schematically in a top view and side view. The device has additionally guiding wheels 14 in the area of the glass edgings for setting the bending radius. The guide wheels 14 are arranged behind the step 7 in the x-direction and are mounted on the common shaft 15. The shaft 15 is driven by its own drive. The guiding wheels 14 here have a higher circumferential velocity than the belt strap 1, so that there is no stop pulse when the glass ribbon 4 is touched. FIG. 7 shows a side view of the device. The shaft 15 of the guiding wheels can be adjusted in terms of their height and their distance from the step, i.e., in the x- and z-directions. Thus, the distances $x_1$, $x_2$ and the height $h_2$ can be adjusted by the position of the guiding wheels 14 or the shaft 15. The point A denotes the point of contact of the glass edge with the guiding wheel 14. The guiding wheel 14 mechanically forces the glass ribbon 4 to bend. Thus, the device shown in FIGS. 6 and 7 is particularly suitable for relatively thick glass ribbons with a thickness in the range from 80 to 150 µm. Due to the high stiffness of the glass, said glass ribbons does not bend, or at least not in time, without applying additional mechanical action.

Further, in the device shown in FIGS. 6 and 7, it is possible to influence the bending radius and the bending stress by using various parameters. The bending stress is influenced by the diameter $D_1$ of the deflection pulleys of the first belt strap 1. The smaller the diameter $D_1$, the greater the bending stress. The diameter $D_1$ is preferably in the range from 25 to 150 mm.

Furthermore, the bending stress can also be controlled by the velocity of the second belt strap 2. The slower the feeding rate $v_2$, the better the glass can lie against the diameter $D_1$ of the deflecting pulley and the more precisely the bending radius can be set via the diameter $D_1$ of the deflecting pulleys. In this case, however, $v_2$ must be large enough that the individual glass ribbon portions still can be separated from each other.

Furthermore, through the height $h_1$ of the step, i.e., the distance between the two belt straps 1 and 2 in the z-direction, the above-described minimum speed of the second belt strap 2 and thus indirectly the bending tension can be set. The higher $h_1$, the better the glass rests against the pulley with the diameter $D_1$ and the greater the time lag and thus the distance to the preceding sheet. This in turn enables the velocity $v_2$ to be reduced, so that the glass can lie even better against the diameter $D_1$ of the deflection pulleys.

The distance and height of the shaft 15 must be in a certain ratio to the edge of the glass ribbon. The height $h_2$ denotes the distance between the two shafts of the belt strap 1 and the guiding wheels. If this height $h_2$ corresponds to the half of the sum of the two diameters $D_1$ and $D_2$, i.e., if $h_2=0.5*(D_1+D_2)$, then a tangent at the lowest point of the guiding wheels is just as high as the glass ribbon 4 on the belt strap 1, i.e., just as high as the belt strap surface of the first belt strap 1. The highest possible contact point A for the guiding wheel 14 is then given. The optimum maximum contact point is achieved when additionally applies to the position of the contact point A: $0.5*(D_1+D_2)+x_1$. The displacement $x_1$ in the horizontal direction is dependent on the glass thickness $d_1$ of the glass ribbon 4, since a thin glass can be contacted earlier than a thick glass and the glass thickness is included in the bending stress as a square. For example, for $x_1$:

TABLE 1

Dependence of the distance $x_1$ on the glass thickness

| Glass thickness $d_1$ [µm] | $x_1$ [mm] |
|---|---|
| 150 | 245 |
| 100 | 75 |
| 75 | 75 |
| 50 | 45 |
| 30th | 30th |
| 20th | 25th |

If the guiding wheels 14 or the shaft 15 are lowered further, then $x_2$, i.e. the distance from the center point of the pulley to the shaft 15, must be increased at the same time in the horizontal direction so that $x_1$ remains the same. The setting of the distances $x_2$ and $h_2$ follows the following equation:

$$x_2 = \frac{D_1}{2} + x_1 + \sqrt{\frac{D_2^2}{4} - \left(h_2 - \frac{D_1}{2}\right)^2}$$

Figure 8:
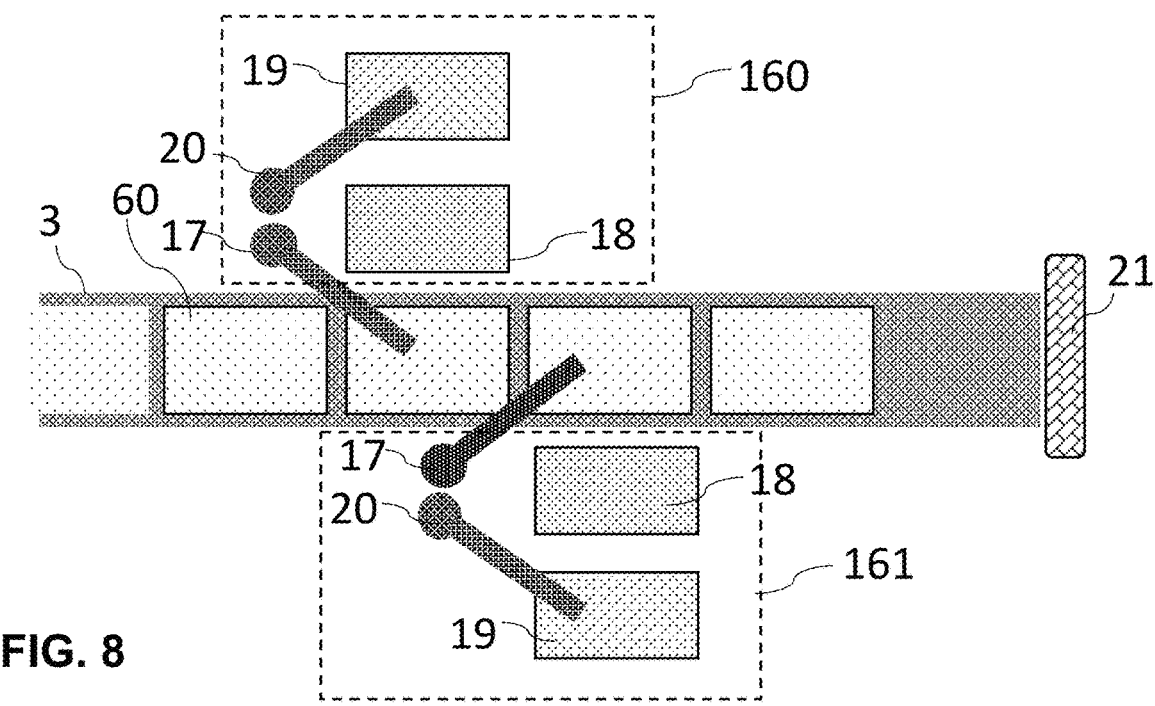
FIG. 8 shows a schematic representation of a packaging station in a plan view.

FIG. 8 shows a section of an embodiment of the device in which two packaging stations 160, 161 are arranged in the region of the third transport device 3. Each packaging station 160, 161 contains a first robot 17 and a second robot 20, a stacking platform 18 and a paper feed system 20. The first robot 17 stacks a glass sheet or a portion of glass ribbon 60 from the third transport device 3 onto the stacking platform 18. Then the second robot 20 places a sheet of paper, which it has removed from the paper feed system 19, onto the glass sheet 60 on the destacking platform 18. The stacking platform moves down by the amount of the glass sheet and paper thickness after each stacking process. This creates stacks of glass and paper of 100 to 500 pieces which can then be fed to the final packaging. Due to the high feeding rate $v_3$ of the third transport device, two packaging stations are arranged in the area of the third transport device 3 in the embodiment shown in FIG. 8. At the end of the third transport device 3 there is a cullet funnel 21 through which rejected sheets are fed to a collecting container. The collecting container is located on a building level below the production level. Since there is a higher air pressure in the production level than in the level of the collecting container, it is ensured that no glass dust can get from the collecting container into the production level.

Figure 9:
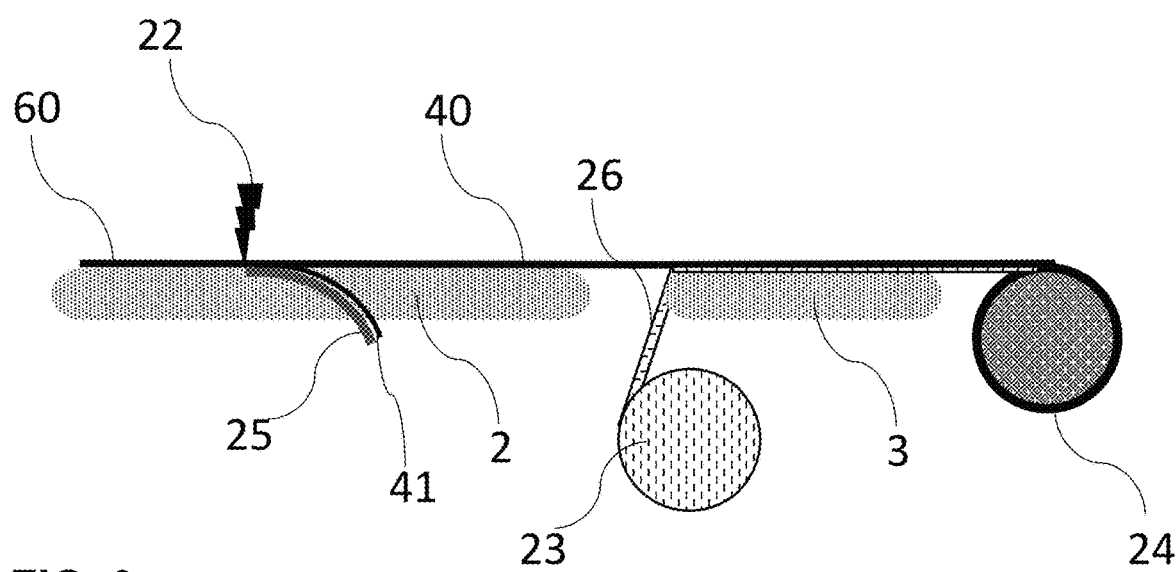
FIG. 9 shows a schematic representation of a further embodiment of the invention including a device for trimming edgings and a packaging station for rolling up the glass ribbon portions in a side view.

In FIG. 9 a section of a further variant of the device is shown schematically in side view. Here the device in the area of the second transport device 2 has a device for continuously separating the edgings on both edge areas of the glass ribbon portion 60. The device 22 is preferably designed as a laser separation. The severed edgings 41 are directed downwards by the transport device 25, while the now border-free glass ribbon portion 40 is transported further from the second transport device 2 to the third transport device 3. A roller device 24 for rolling up the glass ribbon portion 40 is placed in the area of the third transport device 3. Here, the glass ribbon portion 40 is rolled up together with an intermediate paper 26 which is provided by the paper feed 23. The variant shown in FIG. 9 is particularly suitable for rolling up glass ribbon portions with a length in the range from 100 to 1000 m.

Figure 10:
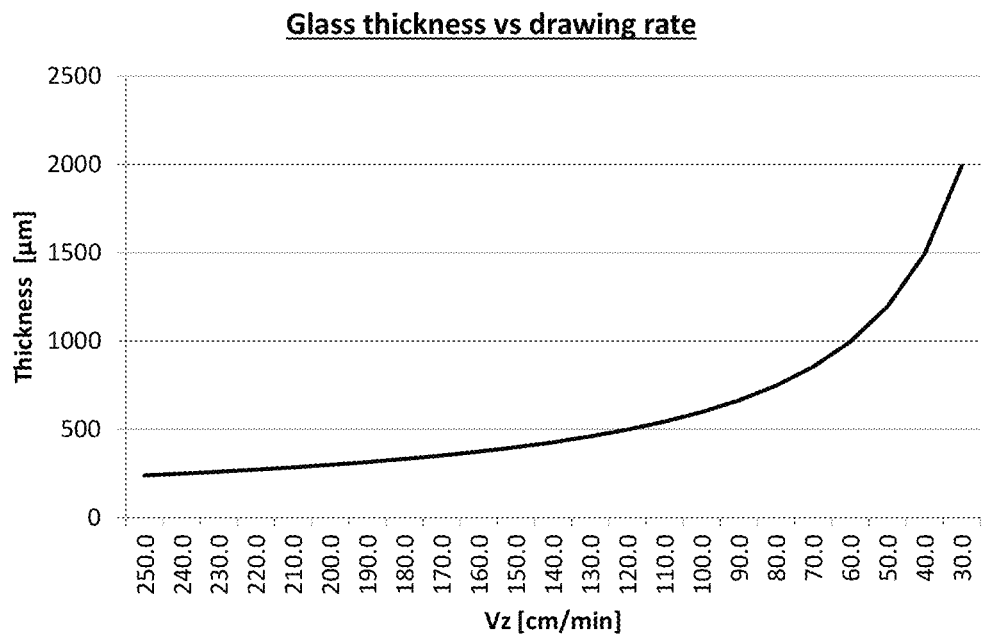
FIG. 10 shows the relationship between the glass thickness and the drawing rate.

FIG. 10 illustrates the relationship between the desired glass thickness $d_1$ and the needed drawing rate $v_z$ necessary. The drawing rate $v_z$ corresponds to the feeding rate $v_1$ of the first transport device. It becomes clear that drawing rate $v_z$ increases significantly with decreasing glass thickness. As a result, very thin glasses have to be drawn at very high drawing drawing rates $v_z$. Because of the velocity $v_z$ and thus also $v_1$, short process times in the cutting process are decisive for the production of short glass sheets.

Figure 11:
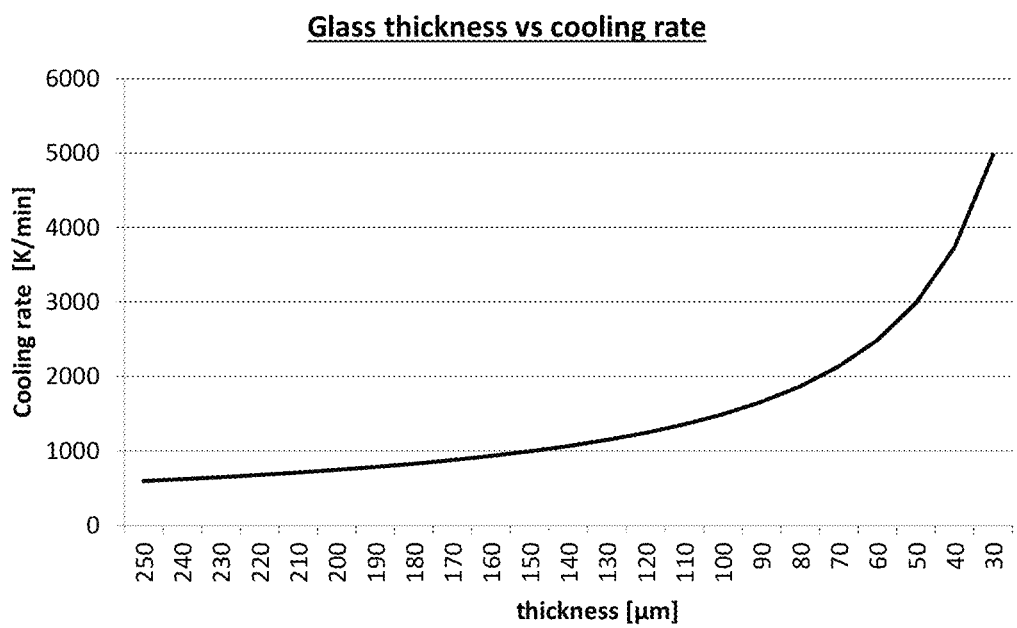
FIG. 11 shows the relationship between cooling rate and glass thickness.

According to a variant of the method according to the invention the glass ribbon passes through a cooling furnace after the shaping process and before it is transported and scored on the first transport device. Since the drawing speed $v_z$ has to be be maintained in the cooling furnace as well, the cooling times for thinner glasses are correspondingly shorter than for thick glasses. One embodiment of the invention therefore provides that the cooling rate increases as the thickness $d_1$ of the glass ribbon decreases. The relationship between glass thickness $d_1$ and cooling rate is shown in FIG. 11.

Figure 12A:
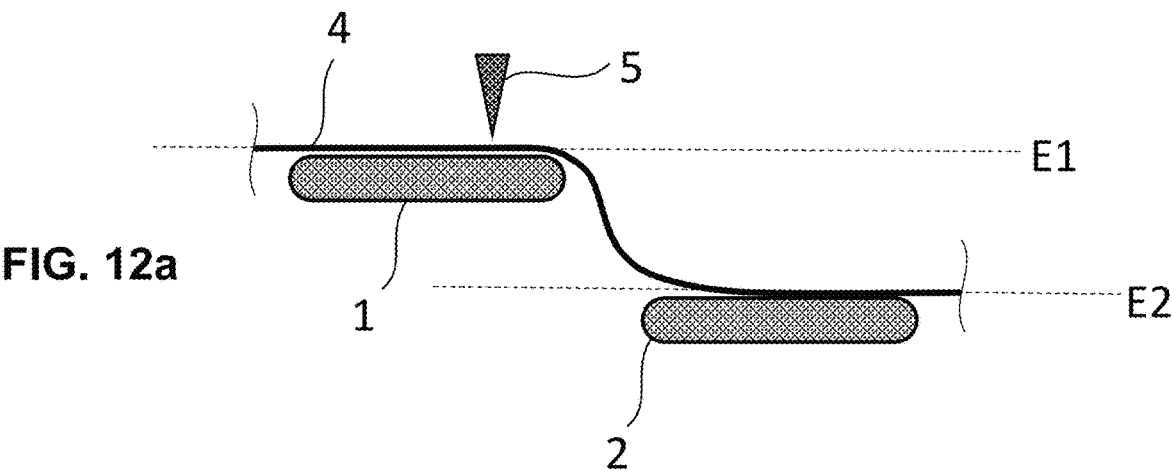
FIGS. 12a-12c show schematic representations of various embodiments in side view which differ from one another with regard to the arrangement of the layers $E_1$ and $E_2$ and FIG. 13 shows a schematic representation of a further embodiment of the invention with a hot forming station.
Figure 12B:
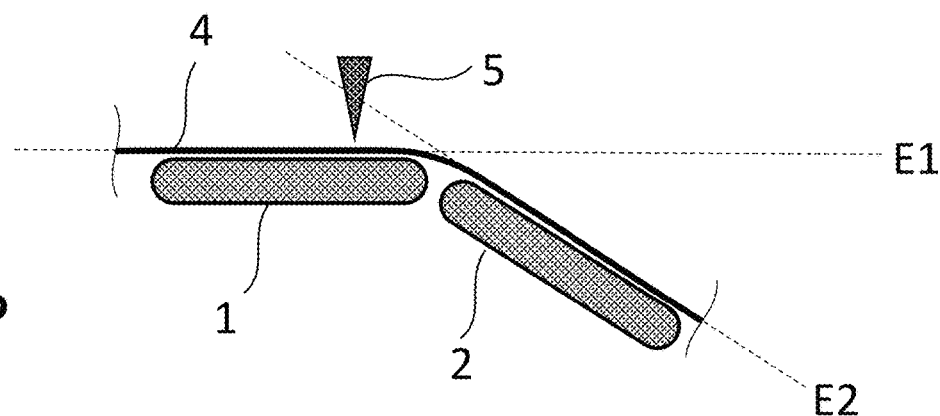
Figure 12C:
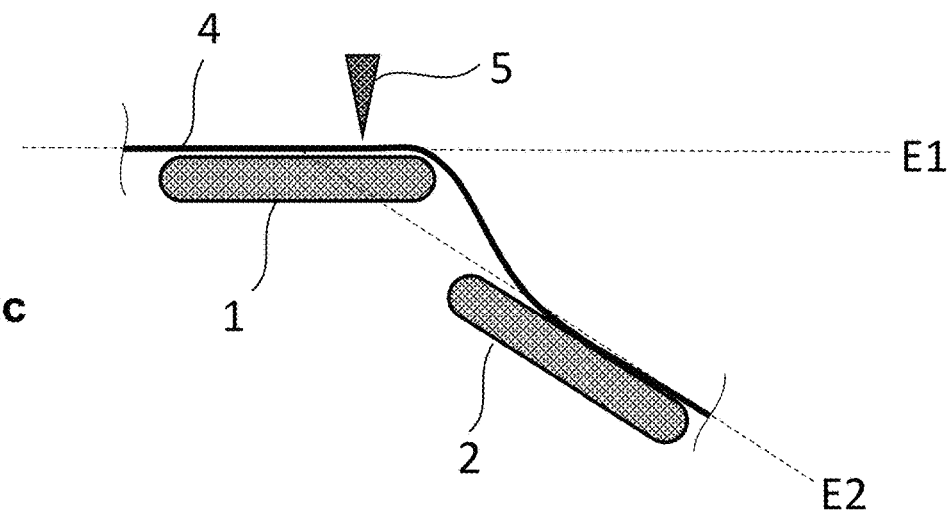

In FIGS. 12a to 12c, various embodiments of the device are shown schematically in side view, which differ from one another with regard to the arrangement of the planes $E_1$ and $E_2$. In FIG. 12a, a device is shown in which the two planes $E_1$ and $E_2$ show a height difference without having an angle difference to each other. In contrast, the planes $E_1$ and $E_2$ in the embodiment shown in FIG. 12b have an angular offset. In the embodiment shown in FIG. 12c, the height difference and the angular offset of the layers $E_1$ and $E_2$ are combined with one another.

Figure 13:
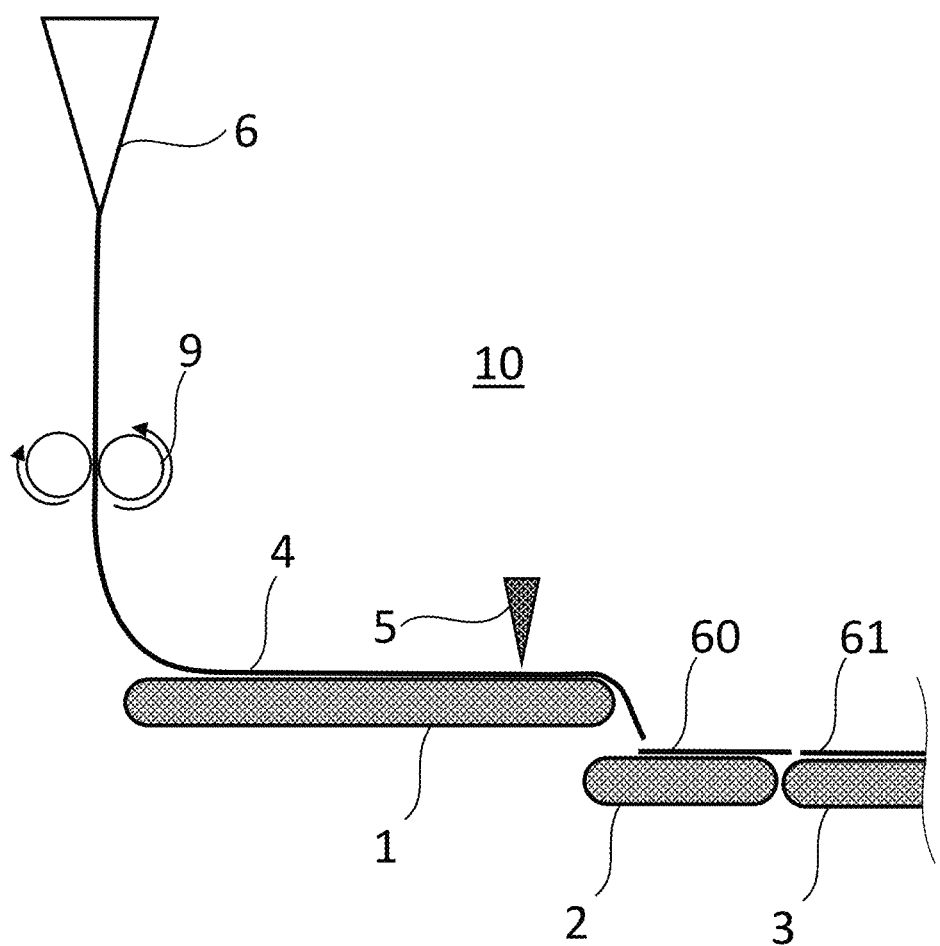

FIG. 13 schematically shows an embodiment of the device with a device for hot forming 6. Here, the glass ribbon 4 is first drawn with the hot forming device 6 in the vertical direction. The transport takes place in the vertical direction by the drawing device 9. After the glass ribbon 4 has been deflected into the horizontal plane, the glass ribbon is transported with the aid of the first transport device 1. In the area of the first transport device 1 there is the scoring device 5 for making a scoring in at least one edge area of the glass ribbon. The glass ribbon 4 is then guided onto the second transport device 2 in a manner analogous to the embodiment described in FIG. 2.

LIST OF REFERENCE SYMBOLS 1, 2, 3 Transport device
4 Glass ribbon
5 Scoring device
6 Hot forming device
7 Range between 1 and 2
8 Score
9 Drawing device
10 Device for the production of glass ribbon portions
11 disc
12th Tool carrier
13 Scribing tool
14 Guiding wheel
15 Shaft
17, 20 Robot
18 Stacking platform
21 Crock funnel
22 Device for trimming the edgings
23 Paper feeder
24 Roller device
25 Transport device
26 Intermediate paper
40 Middle area
41 edging area
50 Scoring device
60, 61, 62 Glass ribbon portion
160, 161 Packing station

What is claimed is:

1. A method for producing glass ribbon portions, comprising:
hot forming a continuous glass ribbon with a ribbon thickness (d) in a range from 15 µm to 150 µm from a glass melt in a hot forming device, wherein the glass ribbon has an interior flat region with the ribbon thickness (d) and edgings of thickened edge regions with an edge thickness that is greater than the ribbon thickness (d);
cooling the glass ribbon at a cooling rate that is dependent on the glass ribbon thickness (d);
transporting the glass ribbon at a velocity ($v_1$);
redirecting the glass ribbon into a first plane $E_1$ and transporting the glass ribbon along the first plane $E_1$ in a transport direction at the velocity $v_1$, wherein the transport direction having the velocity $v_1$ is parallel to the edges of the glass ribbon;
inserting a score only in a thickened edge region, wherein the score is made by a scoring tool at an angle ($\alpha$) to the transport direction of the glass ribbon, and wherein the score is made in at least one of the thickened edge regions;
deflecting the glass ribbon from the first plane $E_1$ to a second plane $E_2$, wherein the glass ribbon is transported in the second plane $E_2$ at a velocity $v_2>0$, wherein the first and the second planes are angled with respect to one another and/or have a height difference with respect to one another so that a zone with bending stress with a main stress line is introduced into the glass ribbon, when the glass ribbon is transferred from the first plane $E_1$ to the second plane $E_2$, wherein the bending stress is set by the difference in position between the first plane $E_1$ and the second plane $E_2$ and/or the difference between the velocities $v_1$ and $v_2$, and wherein when the score enters the zone with the bending stress, a spontaneous cracking at the score occurs and a crack runs along the main stress line and forms edges, thereby separating a portion of the glass ribbon edges in the extension of the score across the glass ribbon in a lateral direction.

2. The method of claim 1, wherein the first velocity ($v_1$) is different from the second velocity ($v_2$).

3. The method of claim 1, wherein the first velocity ($v_1$) is less than the second velocity ($v_2$).

4. The method of claim 1, further comprising separating the glass ribbon portion from the glass ribbon by transporting the glass ribbon portion at a third velocity ($v_3$).

5. The method of claim 4, wherein the first velocity ($v_1$) is less than the third velocity ($v_3$).

6. The method of claim 1, wherein the angle ($\alpha$) is in a range from 80° to 100°.

7. The method of claim 1, wherein the scoring tool is set at an angle $\beta$ to the edge and is adapted to velocity $v_1$ of the glass ribbon and the cutting speed of the scoring tool and the angle ($\beta$) is adapted to the first velocity ($v_1$) and to the scoring velocity ($v_{score}$) so that:

$$\beta = \arccos(v_1/v_{score}).$$

8. The method of claim 1, further comprising moving the scoring tool on an elastic tool carrier so that the scoring tool can adapt to the differential speeds of the glass surface transversely to the cutting direction.

9. The method of claim 1, wherein the deflecting step further comprises:
contacting the glass ribbon with a guiding wheel, wherein between the glass ribbon and the guiding wheel there is a contact point that is in the first plane; and
driving the guiding wheel at a rotational speed that is greater than the first velocity ($v_1$).

10. The method of claim 1, wherein the deflecting step comprises allowing the glass ribbon to bend by its own weight.

11. The method of claim 1, wherein the cooling rate is equal to or greater than 10 K/s.

12. The method of claim 1, wherein the cooling rate is greater than 25 K/s.

13. The method of claim 1, wherein the cooling rate is dependent on the ribbon thickness (d) in a range from (1/d) 5 K/(min*µm) to 280 K/(min*µm).

14. The method of claim 1, further comprising removing the edgings of the glass ribbon portion.

15. The method of claim 1, further comprising:
repeating the generating and diverting so as to break a plurality of glass ribbon portions from the glass ribbon; and
stacking the plurality of glass ribbon portions.

16. The method according to claim 1, wherein the glass ribbon portion has a length in a range from 100 to 2000 m.

17. The method according to claim 1, further comprising:
repeating the generating and diverting so as to break a plurality of glass ribbon portions from the glass ribbon;
removing the edgings of the glass ribbon portion;
sticking the plurality of glass ribbon portions to a paper tape; and
coiling the plurality of glass ribbon portions together with the paper tape.

18. The method according to claim 1, wherein the score has a length between 2 and 6 mm.

19. The method according to claim 1, wherein the score has a bottom point that is above a surface of the interior flat region.

20. A method for producing glass ribbon portions, comprising:
a) hot forming a continuous glass ribbon with a ribbon thickness (d) in a range from 15 µm to 150 µm from a glass melt in a hot forming device, wherein the ribbon has an interior flat region with the ribbon thickness (d) and edgings of thickened edge regions;
b) cooling the glass ribbon at a cooling rate that is dependent on the ribbon thickness (d);
c) transporting the glass ribbon at a velocity ($v_1$);
d) redirecting the glass ribbon into a first plane $E_1$ and transporting the glass ribbon along the first plane $E_1$ in a transport direction at the velocity $v_1$, wherein the transport direction having the velocity $v_1$ is parallel to the edges of the glass ribbon;
e) inserting a score only in a thickened edge region, wherein the score is made by a scoring tool at an angle ($\alpha$) to the transport direction of the glass ribbon, and wherein the score does not extend over the entire width of the glass ribbon;
f) deflecting the glass ribbon from the first plane $E_1$ to a second plane $E_2$, wherein the glass ribbon is transported in the second plane $E_2$ at a velocity $v_2>0$, wherein the first and second planes are angled with respect to one another and/or have a height difference with respect to one another so that a zone having a bending stress with a main stress line is introduced in the glass ribbon when the glass ribbon is transferred from the first plane $E_1$ to the second plane $E_2$, wherein the bending stress is set by the difference in position between the first plane $E_1$ and the second plane $E_2$ and/or the difference between the velocities $v_1$ and $v_2$, wherein when the score enters the zone having the bending stress, a spontaneous cracking at the score occurs and a crack runs along the main stress line and forms edges, thereby separating a portion of the glass ribbon at the edges in the extension of the score across the glass ribbon in a lateral direction, and wherein the deflecting step further comprises:
contacting the glass ribbon with a guiding wheel, wherein between the glass ribbon and the guiding wheel there is a contact point that is in the first plane; and
driving the guiding wheel at a rotational speed that is greater than the first velocity ($v_1$).

21. The method according to claim 20, wherein the score has a length between 2 and 6 mm.

22. A method for producing glass ribbon portions comprising:
a) hot forming a continuous glass ribbon with a ribbon thickness (d) in a range from 15 µm to 150 µm from a glass melt in a hot forming device, wherein the ribbon has edgings of thickened edge regions and an interior flat region;
b) cooling the glass ribbon at a cooling rate that is dependent on the ribbon thickness (d), wherein the cooling rate lies in the range from (1/d)*5 K/min*µm to (1/d)*280 K/min*µm;
c) transporting the glass ribbon at a velocity ($v_1$);
d) redirecting the glass ribbon into a first plane $E_1$ and transporting the glass ribbon along the first plane $E_1$ in a transport direction at the velocity $v_1$, wherein the transport direction having the velocity $v_1$ is parallel to the edges of the glass ribbon;
e) inserting a score only in a thickened edge region made by a scoring tool at an angle ($\alpha$) to the transport direction of the glass ribbon in at least one of the thickened edge regions, and wherein the score does not extend over the entire width of the glass ribbon;
f) deflecting the glass ribbon from the first plane $E_1$ to a second plane $E_2$, wherein the glass ribbon is transported in the second plane $E_2$ at a velocity $v_2>0$, wherein the first and second planes are angled with respect to one another and/or have a height difference with respect to one another, so a zone with bending stress with a main stress line is introduced in the glass ribbon, when the glass ribbon is transferred from the first plane $E_1$ to the second plane $E_2$, wherein the bending stress is set by the difference in position between the first plane $E_1$ and the second plane $E_2$ and/or the difference between the velocities $v_1$ and $v_2$, and wherein when the score enters the zone having the bending stress, a spontaneous cracking at the score occurs and a crack runs along the main stress line and forms edges, thereby separating a portion of the glass ribbon edges in the extension of the score across the glass ribbon in a lateral direction.

23. The method according to claim 22, wherein the score has a length between 2 and 6 mm.

* * * * *